(No Model.)
C. C. CARTER.
HAND HAY RAKE.
No. 323,786. Patented Aug. 4, 1885.
FIG. I.
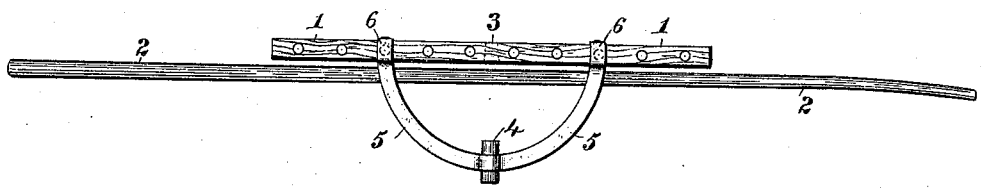
FIG. II.
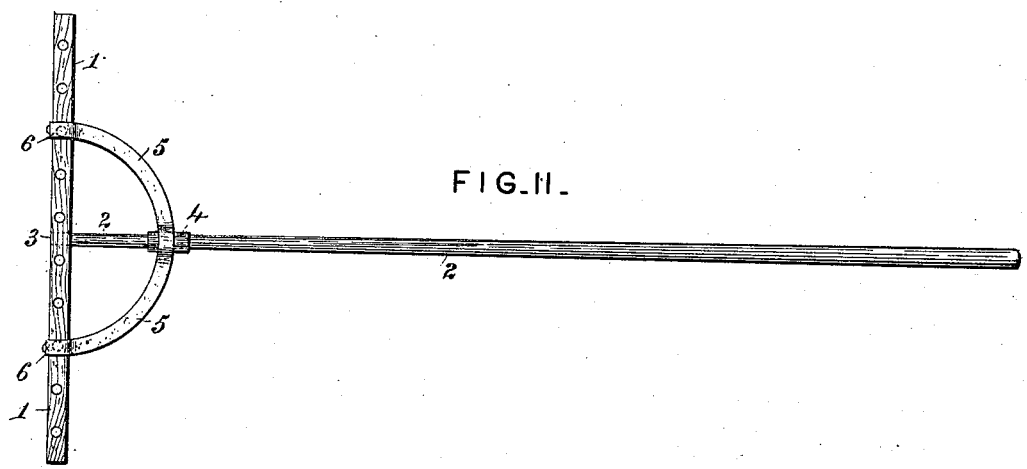
FIG. III.
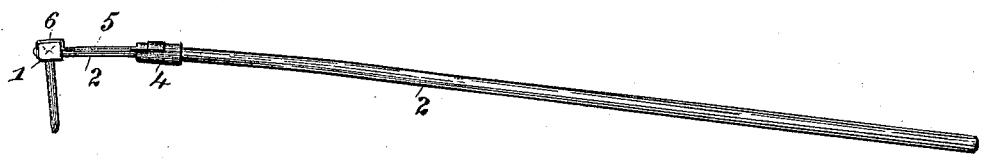
Attest:
Geo. P. Smallwood.
D. W. Hopkins.
Inventor:
Charles C. Carter.
By Knight Bros.
Att'ys

UNITED STATES PATENT OFFICE.

CHARLES C. CARTER, OF BURTON, OHIO.

HAND HAY-RAKE.

SPECIFICATION forming part of Letters Patent No. 323,786, dated August 4, 1885.

Application filed December 15, 1884. (No model.)

*To all whom it may concern:*

Be it known that I, CHARLES C. CARTER, a citizen of the United States, residing at Burton, in the county of Geauga and State of Ohio, have invented a new and useful Improvement in Wooden Hand Hay-Rakes, of which the following is a specification.

The object of the present invention is to provide a wooden hay-rake of knockdown form, so as to be readily taken apart for shipment, while being of greater strength when put together than ordinary wooden hand-rakes having wooden bows or braces. To this end I provide a wooden handle bent in the customary form and having tapered end to occupy a socket in the middle of the rake-head. Accompanying each rake, when shipped, is a metallic brace, preferably of malleable or wrought iron, formed with a bow, a cylindrical socket or ferrule at the center of the bow for the handle, and squared flattened hooks on the ends of the bow to grasp or engage the rake-head, the handle being inserted in a socket in the head.

In order that my invention may be more fully understood, I will proceed to describe it with reference to the accompanying drawings, in which—

Figure I is a plan of my improved rake when the parts are separated for shipment. Fig. II is a top view showing the rake put together for use. Fig. III is a side elevation of the same.

The rake is constructed with the usual head, 1, and handle 2, occupying a socket, 3, in said head. The handle is solid throughout, and has surrounding it near the head a cylindrical socket or ferrule, 4, formed in one with or rigidly attached to malleable or wrought iron bow 5, having squared flattened hooks 6, conforming to the shape of the rake-head, and adapted to be nailed to the head at their ends, so as to brace the head and handle. In this form of rake the handle is bent vertically in the ordinary manner close to the head, so as to give the proper inclination of the head while raking.

It will be seen that a knockdown rake is provided which is capable of being shipped in small compass, and which may be readily put together by the purchaser with scarcely any trouble.

I do not claim, broadly, a rake-head and rake-handle braced together by a metallic frame, as I am aware that such frames are old and well known.

Having thus described my invention, the following is what I claim as new therein and desire to secure by Letters Patent:

1. In a wooden hand hay-rake, the metallic brace formed with a bow, 5, a cylindrical ferrule, 4, at the center of the bow, and squared flattened hooks 6 at the ends of the bow.

2. In a wooden hand hay-rake, the combination, with the head 1, having socket 3, and the handle 2, inserted in said socket, of the metallic brace formed with a bow, 5, a cylindrical ferrule, 4, at the center of the bow, and squared flattened hooks 6 at the ends of the bow.

CHARLES C. CARTER.

Witnesses:
W. S. METCALFE,
C. F. BURLEIGH.